United States Patent Office 2,849,320
Patented Aug. 26, 1958

2,849,320

FOOD COATING PROCESS

Ritchard C. Weinmann, Chestnut Hill, Mass., and Richard A. Cotton, Nashua, N. H.

No Drawing. Application June 1, 1954
Serial No. 433,839

25 Claims. (Cl. 99—169)

This invention relates in general to food products, particularly to prepared meat products, such as smoked meats and sausage products and more specifically to such products which have been treated to preserve the same. This invention also relates to processes for so treating such products and to materials with which such products are treated. The present application is a continuation-in-part of the inventors' copending application Serial No. 398,894, filed December 17, 1953, and now abandoned.

While smoked or spiced meats such as ham and the various sausage products such as bologna and liverwurst, do, when kept under refrigeration, remain in edible condition for some time, they nevertheless undergo a gradual loss of moisture and deteriorate in flavor, color and appearance. In the past such products have been treated in a variety of methods to prevent this deterioration and loss of moisture.

One known method for treating such products comprises coating the same with a wax coating. However, such coatings become brittle at low temperatures, melt on contact with heat, can be easily scratched or dented and cannot withstand the necessary handling from the factory to the consumer. Furthermore, the appearance of a wax coated food product is unsatisfactory due to the lack of transparency of the wax.

Another means for preventing deterioration and loss of moisture of food products is by placing the same in a moisture-proof plastic bag or other container. However, any slight tear in the plastic bag exposes the entire surface of the meat product to the deteriorating effect of the atmosphere. In most cases such plastic bag or container detracts from the appearance of the food product. Furthermore, such bag or container must be opened to use part of the product, thereupon losing its protective value with respect to the remaining part of the product. Furthermore, in many cases, air is trapped within the container and accelerates deterioration of the food product. This can be avoided by vacuum packing. However, the use of vacuum packing has the disadvantage of being relatively expensive and of drawing moisture to the surface of the product. Surface moisture accelerates the formation of mold in the event that there is any rupture of the bag.

Wrapping such products in sheets of plastic material, the edges of which are heat sealed, has all the disadvantages of the plastic bag or container referred to above.

Another means for treating such products comprises coating the same with a gelatin coating. However, such coatings are generally brittle, low in moisture proofness and transparency, and require relatively long drying times. To render such coatings more suitable a relatively expensive and involved laminating procedure is required.

The general object of this invention is to provide a process for packaging food products, and more particularly meat products, so that they will remain in edible condition for considerable periods, even without refrigeration, and will retain their original moisture content, flavor, and appearance indefinitely under refrigeration. Other objects are to provide a packaging process which is simple and economical and which overcomes the drawbacks of the previous processes discussed above. Other objects and advantages will be apparent from the description which follows:

The terms "food products" and "meat products" as used herein include food products and meat products encased or non-encased in a porous casing. For example, the term "meat products" refers to skinless frankfurters, as well as frankfurters having casings, and also includes, but is not limited to, prepared smoked meats, such as ham, tongues, and the like, and prepared sausage products, such as liverwurst, bologna, frankfurters, and the like.

It has been discovered that by applying to such food products, in the form of an aqueous emulsion, a co-polymer of a vinylidene chloride, particularly 1,1 dichloroethylene, and a vinylidene cyanide, particularly acrylonitrile, thereafter drying the emulsion which adheres to the surface of the product and applying heat thereto, a continuous, cohesive, air-tight, moisture proof coating, closely conforming to and in intimate contact with the surface of the food product is formed. Preferably the co-polymer comprises from 70 to 90 percent of 1,1 dichloro ethylene and from 10 to 30 percent of acrylonitrile and is plasticized with a plasticizer of low toxicity, the proportion of such plasticizer ranging from 1 part plasticizer to between about 2.5 and 9 parts co-polymer. Such coating is thin and transparent but has sufficient strength and elasticity so that it is not ruptured by ordinary handling. Furthermore, it is non-toxic, antiseptic, odorless, sufficiently inert so that it does not impart any undesirable flavor to the meat and is resistant to oils and liquids with which the meat might accidentally come in contact. It retains its strength and flexibility as well as its other favorable characteristics over a wide range of temperatures, and although it is in intimate contact with the surface of the food product, it can be readily peeled off when desired without marring such surfaces. A string, tab or label may be imbedded in the coating to facilitate peeling. This coating, in contrast to wax coatings heretofore used, is highly abrasion resistant, springs back into shape after momentary pressure and is not adversely affected by temperatures ranging from below freezing to about 400° F. The coating fits tightly and clings to the surface of the product thereby expelling all air from such surface and leaving no air spaces between the film and the product and no air pockets in which bacteria might develop. This is accomplished without using an expensive vacuum procedure as in the case of plastic bags and containers. In the event that such coating is ruptured in one particular place, only that portion of the surface of the food product which is directly under such torn portion is exposed to the atmosphere, whereas the remainder of the surface of the product remains protected. This is due to the fact that the coating is in intimate contact with the surface of the product. Furthermore, after a portion of the food product is cut off, as for example, when a portion of a bologna is sliced, the remaining portion remains protected from the atmosphere. If desired, coloring material may be added to the emulsion, so that the resulting coating is colored to further enhance the appearance of the food.

The coating process lends itself readily to mechanical handling of the meat product in such a way that the prepared food need not be touched by the hands during the coating thereof. Transfer of disease-carrying bacteria and mold-forming spores to the interior of the package is thus reduced to a minimum. As a further advantage of this process over certain vacuum packing processes, moisture is not drawn to the surface of the food product. Food products packed in accordance with the present invention remain in edible condition for considerable periods, even without refrigeration, and will retain their original moisture content, flavor and appearance indefinitely under refrigeration.

In accordance with the present invention, the food is first prepared in the usual way. The coating is then applied as described in the following examples:

*Example I*

A bologna was prepared in a regenerated cellulose casing in a conventional manner. The bologna was then momentarily dipped in a coating composition prepared as follows: all parts referred to are parts by weight and are based on the same unit of weight.

1.0 part of alkyl aryl polyether alcohol (sold under the trade name Triton X–100), 0.2 part of ammonium persulfate and 42.5 parts of water were placed in a vessel having a reflux condenser and high speed stirrer and mixed until complete solution was achieved. A mixture of 30 parts of 1,1 dichloroethylene, 8 parts of acrylonitrile and 6 parts of 2-ethylhexyl diphenyl phosphate (Santicizer 141) was added to the vessel. The contents of the vessel were then thoroughly mixed by the high speed stirrer and while being so mixed there was added a solution of 0.1 part of sodium bisulfite in 2.0 parts of water. Stirring was continued for three hours while the temperature of the batch was maintained between 30° C. and about 35° C., whereby the 1,1-dichloroethylene and the acrylonitrile were emulsion copolymerized and an aqueous emulsion of the resulting copolymer was formed. 5 parts of diisobutyl adipate, 4 parts of water, 0.5 part of ammonium hydroxide (14% aqueous solution), 0.5 part of a 10% by weight solution of hydroxyethyl cellulose in water and 0.2 part of alkyl aryl polyether alcohol (sold under the trademark Triton X–100) were mixed for ten minutes in an open vessel with a high speed stirrer. A second emulsion was formed. The second emulsion was blended with the first emulsion with a low speed mixer to form the final emulsion. The bologna was dipped into the final emulsion, with the emulsion at room temperature. The coating of emulsion which adhered thereto upon removal from the coating composition was then dried at room temperature. Adequate drying of the emulsion coating is evidenced by a transition of the coating from a white color to a substantially clear film. The bologna with the dried coating therearound was then placed in a dry oven at 200° F. and left there for 5 minutes. The resulting bologna had a tough, flexible, air and moisture-proof film therearound which closely conformed to the shape thereof. The film was about 1000th of an inch thick, was highly transparent and had more than adequate strength to withstand ordinary handling in shipment and storage. It was readily slit and peeled off when desired. It did not become brittle at low temperatures and did not melt when heated as high as 300° F. It was not easily scratched or dented, and was highly abrasion-resistant. It sprang back into shape after momentary pressure. This bologna did not appreciably change in appearance after two months under normal refrigeration. Upon inflicting a slight tear in the coating and subjecting the food product to molding conditions, only the portion immediately under the tear molded, became dry and deteriorated. Upon cutting the bologna in half, only the exposed portion and the part immediately adjacent thereto was subject to the deteriorating effects of the atmosphere.

*Example II*

A second coating composition was prepared in the exact manner referred to in Example I, except that in forming the second emulsion, a mixture of 5 parts of dibutyl sebacate, 0.2 part of Triton X–100, 1.0 part of polyvinyl alcohol (10% by weight solution in water) and 4.0 parts of water was used. A bologna of the same type utilized in Example I was dipped into the final emulsion and dried, in the same manner as described in Example I. The bologna with the dried coating thereon was then dipped into a hot water bath at a temperature of 200° F. for approximately 10 seconds. Thereafter the bologna was dipped into a cold water bath at a temperature of about 60° F. and thereafter removed and dried. The resulting coating and product had the same properties as the coating and product of Example I. Although in the examples a regenerated cellulose casing was used, any conventional animal or synthetic casing may be used. These casings, in the case of smoked meats and sausage products, must be porous to allow smoke penetration during the production thereof. It is this porosity which renders the casing ineffective as a protective package. Although impervious plastic coatings have been applied to conventional porous casings before the food product is prepared therein, these coated casings are unsuitable for smoked meats and sausages since they do not allow smoke penetration in the production thereof.

Although the product of the example was dipped into the emulsion at approximately room temperature, the product can be dipped into emulsions at temperatures ranging from about 40° F. to 150° F. However, the preferred temperature range is average room temperature plus or minus 10° F. Many times when the emulsion is applied to freshly prepared products, the products may still be hot from the preparations thereof. The temperature of the food when it is dipped may vary from about 50° to 150° F., but the preferable temperature thereof is from about 70° to 100° F. Dipping is the preferred method of applying the coating, but the composition may also be sprayed, showered, or brushed on the food.

Although the emulsion coating of the dipped product is preferably dried by standing at room temperature, any conventional drying means, such as forced dry air circulation or elevated temperatures below 150° F., and preferably below 100° F., may be used. The emulsion when applied to the surface of the food product adheres as a coating in the form of minute droplets or particles in a size range from 0.1 to 1.0 micron, composed of the copolymer and plasticizers surrounded by a matrix of water containing thickeners and pH adjusters hereinafter described, with a diffuse layer of emulsifier surrounding the individual droplets within the matrix. The air drying of the coating causes the evaporation of the aqueous matrix leaving the droplets or particles of plasticized copolymer in intimate contact with each other, but still as substantially individual droplets. If the plasticizer content is sufficiently high (greater than about 1 part plasticizer to 2.5 parts copolymer), these droplets will, upon evaporation of the aqueous matrix, flow to form a continuous film without the application of heat. However, the use of such amounts of plasticizer is not suitable for the reasons given hereinafter. With suitable lower plasticizer contents, as set forth hereinafter, it is necessary to elevate the temperature of the film to at least about 150° F., to increase the plastic fluidity of the droplets so that they will fuse into a continuous film. The lower the plasticizer content the higher the temperature necessary to effect this consolidation or fusion. Although the omission of this step will produce a coating having some protection, it is this consolidation step which causes the film to be strong, moisture-proof, continuous and stable, whereby the food product is afforded its maximum degree of protection. Instead of heating in an oven or in a hot water bath, the coating can be consolidated by the application of heat in any conventional manner, such as forced hot air, infra-red light, radiant heat, steam, etc. Consolidation may also be achieved by heat from within the coated product, by coating products with internal temperatures ranging from 150° F. to 190° F. after the surface has been cooled by showering briefly with cold water. Preferably consolidation temperatures range from about 180° F. to about 210° F., but the film may be consolidated at any temperature above 150° F. The time during which the dried coating is subjected to heat during consolidation depends upon whether dry heat or wet heat is used and, in any event, decreases with the use of increasing temperatures. With the use of dry heat, at a temperature of 150° F., the consolidation time is ordinarily about 10 minutes or more; at 180° F. such time is ordinarily about 5 minutes or more; at 210° F. such time is ordinarily about 3 minutes or more. With the use of wet heat, such as a hot water bath, these consolidation times may be reduced to about one sixtieth of the above times. Therefore, the use of a hot water bath is preferred. The maximum time during which the dried coating is subjected to heat is not critical from the standpoint of the coating itself. It is apparent, however, that prolonged exposure of the food product to high temperatures will result in cooking or otherwise changing the character of the food. One of the chief advantages of the coating material here described is that the film can be consolidated at moderate temperature and in a short enough time so that the character and appearance of the food are not appreciably affected. The coating may be consolidated at any time after the drying step, but preferably is consolidated immediately after the drying. Although it is not essential, the product having the consolidated coating is preferably showered or rinsed with cool or cold water to cool the product rapidly and also to remove all surface emulsifier from the consolidated coating. Especially when the coating is consolidated by the use of dry heat, the coated product should be washed with water, preferably by showering. A period of from about 3 to 7 minutes is satisfactory, but the length of the showering period is not crticial. In the event that the consolidation is carried out by immersion in hot water, the coated product may be either showered for about one minute or more, or immersed in cold water for ½ minute or more. Showering or immersion in cold or cool water after the consolidation step is preferred as it improves the appearance of the film, but it is not essential to the effectiveness of the film as a preservative.

If a stronger film is required for any special purpose, the article may be dipped several times, air drying the coating between each dip, until the desired thickness is achieved. A slight loss in transparency occurs as the thickness of the film is increased. Alternatively, a thicker film may be obtained in a single dip by reducing the amount of water in the coating composition, or by the addition of a thickening agent such as the hydroxyethyl cellulose or polyvinyl alcohol referred to in the examples above. It is desirable that the final emulsion be maintained either neutral or slightly basic in order to maintain maximum stability of the emulsion, and therefore it may be necessary to add a basic agent, such as the ammonium hydroxide solution referred to in the above example.

Although the examples above refer to a particular vinylidene chloride, namely, 1,1 dichloro ethylene, any vinylidene chloride such as vinyl chloride is also suitable. It is understood that the term "vinylidene" as used in the present specification and claims refers to the group $CH_2=C<$, and includes the vinyl group $CH_2=CH<$.

In place of the acrylonitrile in the example, any unsubstituted or lower alkyl (between 1 and 5 carbon atoms) alpha substituted vinyl cyanide, as for example, alpha-methyl vinyl cyanide can be used. The use of a copolymer of a vinylidene chloride and a vinylidene cyanide is greatly preferred, but it is understood that any solid copolymer of a vinylidene chloride and any other vinylidene compound can be used.

The vinylidene chloride-vinyl cyanide copolymer may contain from 5% to 95% vinylidene chloride, the remaining percentage being acrylonitrile or any other lower alkyl alpha substituted vinyl cyanide. Preferably the copolymer should contain from about 70% to 90% of a vinylidene chloride such as 1,1 dichloro ethylene and from about 10% to 30% of a vinyl cyanide such as acrylonitrile.

Although the examples disclose the use of particular copolymerization catalysts, such as ammonium persulfate and sodium bisulfite, other conventional polymerization catalysts, promoters or activators may be utilized, which will not cause the resultant emulsion to impart toxicity to the coated food product. Furthermore, any known type of emulsion polymerization can be used to form the coating emulsion of the present invention. It is not necessary that the polymerization be carried out by an emulsion polymerization. It is within the scope of the present invention to form a copolymer and thereafter form an aqueous emulsion of the same.

Instead of the dibutyl adipate, 2-ethylhexyl diphenyl phosphate and dibutyl sebacate, plasticizers used in the examples, any plasticizer which is compatible with the copolymer and has a low degree of toxicity can be used in forming the coating compound. In particular, any plasticizer which has been approved by the U. S. Department of Agriculture for use in rubber or synthetic resins intended for contact with federally inspected food products has a sufficiently low degree of toxicity for use in the present invention. Such plasticizers include ethyl phthalyl ethyl glycolate, p-tertiary butyl phenyl salicylate, 3 - (2 - xenoxy) 1,2-epoxypropane, 2-ethylhexyl diphenyl phosphate, butyl phthalyl butyl glycolate, glycerol monooleate, acetyl tributyl citrate, di-isobutyl adipate, butyl stearate, glycerol, dibutyl sebacate and sorbitol. Preferred plasticizers are dibutyl sebacate, di-isobutyl adipate, 2-ethylhexyl diphenyl phosphate, or any combination of the aforesaid.

The proportion of plasticizer to copolymer should be no greater than 1 part of plasticizer for each 2.5 parts of copolymer, since most plasticizers, even those approved by the U. S. Department of Agriculture, have some degree of toxicity, and higher proportions of plasticizer tend to increase the penetration of said plasticizer into the food product. Furthermore, greater amounts of plasticizer render the finished coating tacky and less moisture-proof. The minimum amount of plasticizer should be about one part of plasticizer to about 9 parts of copolymer. This minimum proportion is dictated by the fact that less plasticizer will cause the coating to be more brittle. A preferred amount of plasticizer ranges from about one part plasticizer to between about 3.0 and 4.5 parts of copolymer.

Instead of the Triton X–100 set forth in the examples, any conventional non-ionic emulsifying agent can be used, such as an aromatic polyethylene glycol ether (sold under the trade name Antarox–A400), or a fatty alcohol sulfate (sold under the trade name Duponol M. E.). Sufficient emulsifier should be used to form a stable emulsion. The amount of emulsifier required to form a stable emulsion may be determined by routine experiment. Greater quantities of emulsifier should be avoided since they cause the coating to be hygroscopic, whereby it then tends to pick up moisture, which causes a slight re-emulsification of the coating, resulting in cloudiness and tackiness. Also, an excess of emulsifier may impart a bitter or soapy taste to the product. The amount of emulsifying agent required to form a stable emulsion ordinarily ranges from between about 0.5% to about 3% by weight of the emulsion. Usually a 1% by weight of emulsifier is adequate to form a stable emulsion without having an excess of emulsifier.

The amount of water in the emulsion is not critical, the minimum amount being dictated by the point at which the emulsion becomes very viscous and difficult to handle, the maximum amount of water depending upon how thin a film is desired. The viscosity of the emulsion coating is not important except from a practical standpoint. For example, if viscosity is too high, the coating composition becomes very difficult to work with and if the viscosity is too low the resulting coating of the food product is very thin. Ordinarily the viscosity ranges from 25 to 50 centipoises. However, the invention is in no way limited to such viscosity. Ordinarily the percentage by weight of water may range from 22% to about 84.5% of the overall composition, depending on the overall proportions of the other components and the type of coating which is desired. A preferable range is from about 25% to about 60% and a preferred amount is about 50%. In the event that the resin is acidic and must be rendered neutral or slightly basic in order to give increased stability and decreased toxicity to the emulsion, any basic compound other than the ammonia solution referred to in the example may be used so long as it does not produce an appreciably ionized compound and so long as it is not used in such quantity as will impart toxicity to the coated product.

We claim:

1. The process of packaging a food product comprising applying to the surface of said product a coating of a liquid coating composition comprising an aqueous emulsion of a solid vinylidene resin plasticized with a plasticizer of low toxicity, the proportion of plasticizer being about 1 part plasticizer to between about 2.5 and about 9.0 parts resin, drying said coating and consolidating the coating by the appilcation of heat thereto to render it substantially continuous.

2. The process of packaging a food product comprising applying to the surface of such product a liquid coating composition comprising an aqueous emulsion of a solid vinylidene resin plasticized with a plasticizer of low toxicity, the proportion of plasticizer being about 1 part plasticizer to between about 2.5 and about 9.0 parts resin, drying said coating at a temperature below the minimum temperature at which substantial consolidation of the plasticized resin particles in the emulsion occurs to convert the emulsion into a solid, dried, substantially unconsolidated residue of particles of plasticized resin and subsequently subjecting the dried coating to heat for a sufficient length of time to consolidate said particles and render the coating continuous, cohesive, substantially air-tight, and moisture-proof.

3. The process of packaging a food product comprising applying to the surface of such product a liquid coating composition comprising an aqueous emulsion of a solid resinous copolymer of a vinylidene chloride and another vinylidene compound plasticized with a plasticizer of low toxicity, the proportion of plasticizer being about 1 part plasticizer to between about 2.5 and about 9.0 parts resinous copolymer, removing water from the coating so applied and subjecting the coating with said water removed therefrom to heat for a sufficient length of time to consolidate the coating and render it continuous, cohesive, substantially air-tight and moisture-proof.

4. The process as described in claim 3, wherein said other vinylidene compound comprises one of the group consisting of an unsubstituted and a lower alkyl alpha substituted vinyl cyanide.

5. The process as described in claim 4 wherein said vinylidene chloride comprises 1,1 dichloroethylene and said vinyl cyanide comprises acrylonitrile.

6. The process as described in claim 5, wherein the lower limit of the amount of said plasticizer is about 1 part of plasticizer to about 4.5 parts copolymer.

7. The process as described in claim 6, wherein said copolymer comprises a copolymer of from about 70% to about 90% of 1,1 dichlorethylene and from about 10% to about 30% of acrylonitrile.

8. The process as described in claim 7, wherein said plasticizer comprises at least one of the group consisting of ethyl phthalyl ethyl glycolate, p-tertiary butyl phenyl salicylate; 3-(2-xenoxy) 1,2-epoxypropane; 2-ethylhexyl diphenyl phosphate; butyl phthalyl butyl glycolate; glycerol monooleate; acetyl tributyl citrate; di-isobutyl adipate; butyl stearate; glycerol; dibutyl sebacate; sorbitol, and any combination thereof and wherein said food product is a prepared meat product.

9. The process as described in claim 8, wherein said plasticizer comprises 2-ethylhexyl diphenyl phosphate.

10. The process of claim 8, wherein said heating step is carried out at a temperature of at least 150° F.

11. The process of claim 10, wherein said drying step is carried out at a temperature below 150° F.

12. The process of claim 10, wherein said heating step is carried out by applying hot water to the dried coating.

13. The process as described in claim 10, wherein said heating step is carried out by means of dry heat.

14. The process as described in claim 10, wherein said coating is quenched by contact with cool water after said heating step.

15. The process as described in claim 10, wherein the internal temperature of the product is sufficiently high to perform the heating step.

16. The process of packaging a food product comprising dipping the product into an aqueous emulsion of a solid vinylidene resin plasticized with a plasticizer of low toxicity, the proportion of plasticizer being about one part plasticizer to between about 2.5 and about 9.0 parts copolymer, thereafter drying the coating of resin adhered to said food product by said dipping and subsequently subjecting the dried coating so applied to heat for a sufficient length of time to consolidate the coating and render it continuous, cohesive, substantially air-tight, and moisture-proof.

17. The process of packaging a food product comprising showering the product with an aqueous emulsion of a solid vinylidene resin of low toxicity, the proportion of plasticizer being about one part plasticizer to between about 2.5 and about 9.0 parts copolymer, thereafter drying the coating of resin which adheres to the product and subsequently subjecting the dried coating to heat for a sufficient length of time to consolidate the coating and render it continuous, cohesive, substantially air-tight and moisture-proof.

18. The process of packaging a prepared meat product comprising applying to the surface of such product a coating of a liquid coating composition comprising an aqueous emulsion of a solid vinylidene resin of low toxicity, the proportion of plasticizer being about one part plasticizer to between about 2.5 and about 9.0 parts copolymer, drying said coating at a temperature below 150° F. to convert the emulsion into a solid residue of substantially unconsolidated particles of plasticized resin and subsequently subjecting the dried coating to heat at a temperature of at least 150° F. for a sufficient length of time to consolidate the coating and render it continuous, cohesive, substantially air-tight, and moisture-proof.

19. The process as described in claim 18 said product being a sausage product.

20. The process as described in claim 19, said product being a sausage product in a porous casing, and the coating being applied to the surface and pores of the casing.

21. The process described in claim 8 wherein said plasticizer comprises di-isobutyl adipate.

22. The process described in claim 8, wherein said plasticizer comprises di-butyl sebacate.

23. The process described in claim 8 wherein said plasticizer comprises a mixture of 2-ethylhexyl diphenyl phosphate and di-isobutyl adipate.

24. The process described in claim 8 wherein said plasticizer comprises a mixture of 2-ethylhexyl diphenyl phosphate and dibutyl sebacate.

25. A process according to claim 6 wherein the proportion of said plasticizer is from about 1 part plasticizer to between about 3.0 and 4.5 parts copolymer.

References Cited in the file of this patent

UNITED STATES PATENTS

| | | |
|---|---|---|
| 2,538,002 | Irons et al. | Jan. 16, 1951 |
| 2,538,737 | Stanton et al. | Jan. 16, 1951 |
| 2,556,278 | Irvine | June 12, 1951 |
| 2,611,708 | Owens et al. | Sept. 23, 1952 |
| 2,686,726 | Grantham | Aug. 17, 1954 |